US006594033B1

(12) United States Patent
Kujirai et al.

(10) Patent No.: US 6,594,033 B1

(45) **Date of Patent: *Jul. 15, 2003**

(54) INFORMATION PROCESSING APPARATUS, INFORMATION PROCESSING METHOD, MEMORY MEDIUM, AND PRINTER DRIVER

(75) Inventors: Yasuhiro Kujirai, Tokyo (JP); Koji Nakagiri, Kawasaki (JP); Satoshi Nishikawa, Yokohama (JP); Yasuo Mori, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,079

(22) Filed: Jul. 8, 1999

(30) Foreign Application Priority Data

Jul. 10, 1998 (JP) .......................................... 10-196337

(51) Int. Cl.[7] ............................................... G06K 15/00

(52) U.S. Cl. ..................................................... 358/1.18

(58) Field of Search ................................ 358/1.1, 1.12, 358/1.16, 1.18, 1.15, 515, 1.13; 382/112, 284, 283; 399/6; 707/515, 516, 517, 520, 525, 527

(56) References Cited

U.S. PATENT DOCUMENTS 5,995,719 A * 11/1999 Bourdead'hui et al. .... 358/1.12

FOREIGN PATENT DOCUMENTS

| | | |
|---|---|---|
| JP | 6-28117 A | 2/1994 |
| JP | 7-129393 | 5/1995 |
| JP | 7-144459 | 6/1995 |
| JP | 7-256975 A | 10/1995 |
| JP | 8-297547 A | 11/1996 |

* cited by examiner

*Primary Examiner*—Arthur G. Evans

(74) *Attorney, Agent, or Firm*—Fitzpatrick, Cella, Harper & Scinto

(57) ABSTRACT

Additional information can be combined only on a page unit basis with a page layout in which a plurality of pages are combined to one sheet. In case of outputting spooled print data, the additional information is first divided into the additional information in which an object to be added is logical pages and the additional information in which an object to be added is a physical page. When a plurality of logical pages are combined into one physical page, additional information is combined every logical page. When the formation of one physical page is finished, additional information of each physical page is combined.

15 Claims, 16 Drawing Sheets

☐ Add Page Number

Additional Object
○ Logical Page
⦿ Physical Page

| Text (T): | |
|---|---|
| Font (F): | MS P MING ▼ |
| Style (Y): | Standard ▼ |
| Size (S): | 72 ▲▼ |
| Color (C): | ☐ 50% Gray ▼ |

FIG. 14
| | |
|---|---|
| Page Number | ¥ p |
| User Name | ¥ u |
| Date | ¥ d |
| ¥ Mark | ¥¥ |
FIG. 15A
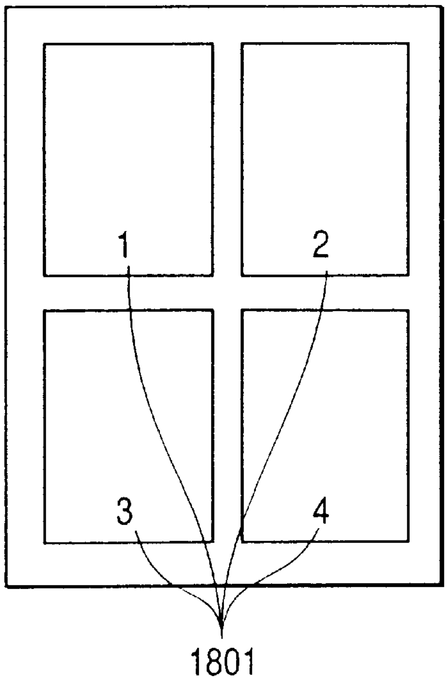
FIG. 15B
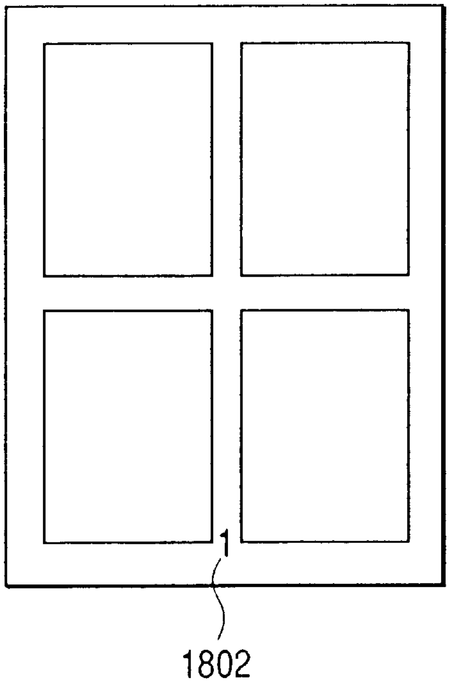

INFORMATION PROCESSING APPARATUS, INFORMATION PROCESSING METHOD, MEMORY MEDIUM, AND PRINTER DRIVER

BACKGROUND OF THE INVENTION

1. Field of the Invention

The invention relates to an information processing apparatus having a printer driver to generate print data to be printed by a printing apparatus and relates to a control method of such an apparatus.

2. Related Background Art

Hitherto, there are a number of applications for performing the printing after additional information such as page number, date, and the like was added to each page of a document. According to such applications, after the additional information was combined with each page, data is outputted to the OS, and a printer driver which receives such data generates print data as it is, thereby allowing a printer to print the print data.

Hitherto, therefore, when a document generated by an application which does not add the additional information such as page, date, and the like is printed, the page, date, and the like cannot be added.

In the printer or printer driver, in case of using a printing method (hereinafter, referred to as an N-page print or N-up print) by which a plurality of pages (hereinafter, referred to as logical pages or simply referred to as pages) which received a print command from the application are reduced and arranged to one sheet and printed, the additional information which is added by the application is added to each logical page. Therefore, the additional information is not added to a physical page (comprising the N logical pages) reconstructed for the N-page print by the printer or printer driver. That is, a print result is as shown in FIG. 15A.

Therefore, even if the user desires a layout such that although the N-page print is performed, the additional information is added every sheet (every physical page) without performing the reduction by the N-page print, namely, a print result as shown in FIG. 15B, it cannot be realized.

SUMMARY OF THE INVENTION

The invention is made in consideration of the above problems and it is an object to provide print control method and apparatus which can add additional information even to a reconstructed page layout by a format desired by the user.

To accomplish the above object, according to the invention, there is provided a print control method comprising:

a forming step of forming an image in which images of a predetermined number of pages are combined onto one sheet on the basis of data of a page unit;

a combining step of combining designated additional information with the image of each sheet; and an output step of outputting the image combined with the additional information.

There is also provided a print control apparatus comprising:

forming means for forming an image in which images of a predetermined number of pages are combined onto one sheet on the basis of data of a page unit;

combining means for combining designated additional information with the image of each sheet; and output means for outputting the image combined with the additional information.

There is also provided a computer-readable memory medium to store a program which is realized by a computer, wherein the program comprises:

a forming step of forming an image in which images of a predetermined number of pages are combined onto one sheet on the basis of data of a page unit;

a combining step of combining designated additional information with the image of each sheet; and an output step of outputting the image combined with the additional information.

BRIEF DESCRIPTION OF THE DRAWINGS

FIG. 14 is a diagram showing an example of a control character train;

FIGS. 15A and 15B are diagrams showing examples of additional information added to each of logical pages and physical pages;

DETAILED DESCRIPTION OF THE PREFERRED EMBODIMENTS

A print system suitable to apply the invention will now be described hereinbelow.

<Construction of Printer Control System>

Figure 1:
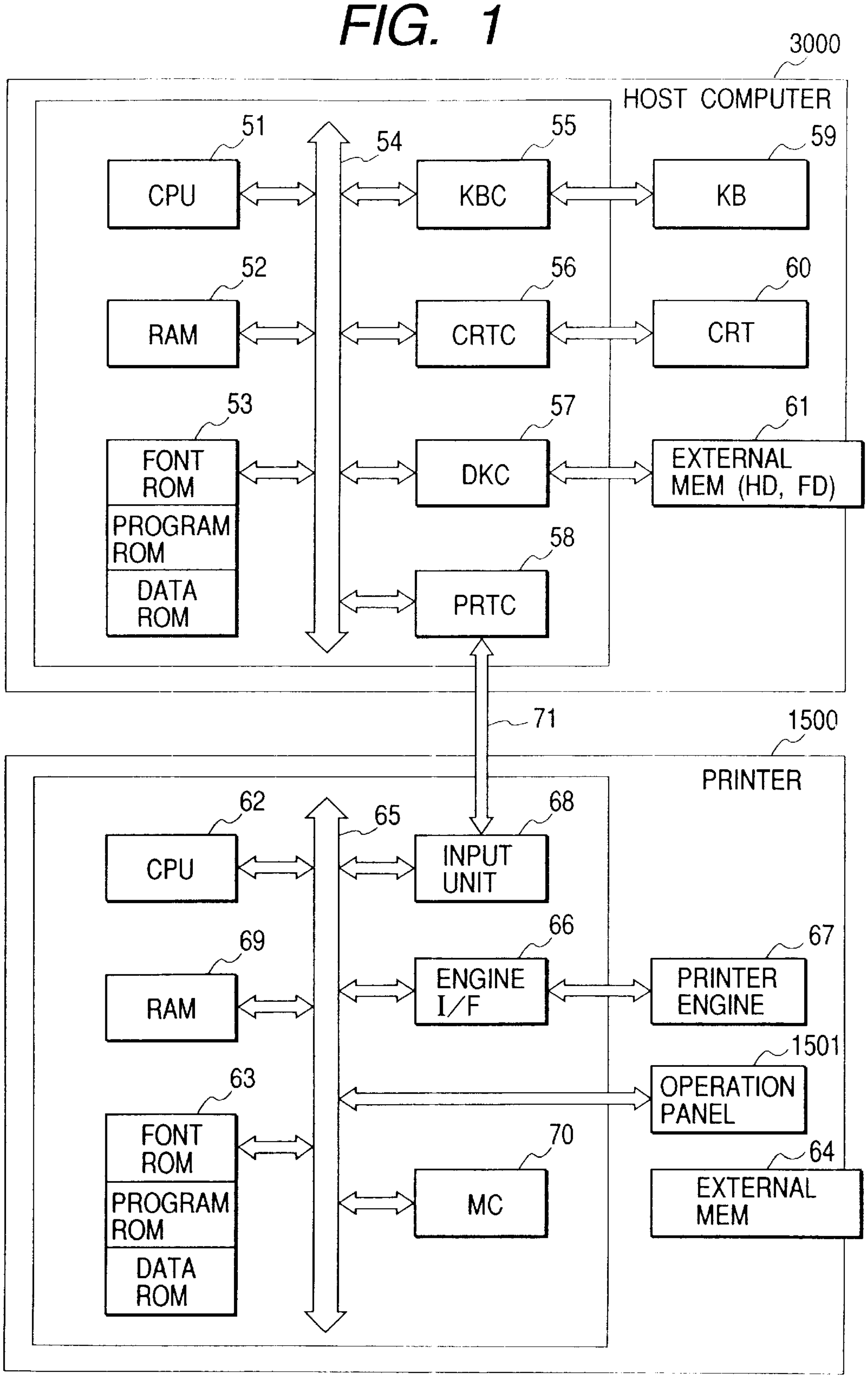
FIG. 1 is a block diagram of a print system according to an embodiment of the invention.

FIG. 1 is a block diagram of a printer control system of the first embodiment. The invention can be applied to any of sole equipment, a system comprising a plurality of equipment, and a system which is connected via a network such as LAN, WAN,or the like and in which processes are executed so long as the functions of the invention are performed.

In the diagram, a host computer 3000 has a CPU 51 to execute processes of a document in which a figure, images, characters, table (including a spreadsheet or the like), etc. mixedly exist on the basis of an application program or the like as a document processing program stored in a program ROM of an ROM 53 or an external memory 61. The CPU 51 integratedly controls each device connected to a system bus 54. An operating system program (hereinafter, referred to as OS) as a control program of the CPU 51 and a printer driver and the like, which will be explained hereinafter, are stored in the program ROM of the ROM 53 or the external memory 61. Font data or the like which is used in the document process is stored in a font ROM of the ROM 53 or the external memory 61. Various data which is used in the document process or the like is stored in a data ROM of the ROM 53 or the external memory 61.

An RAM 52 functions as a main memory, a work memory, or the like of the CPU 51.

A keyboard controller (KBC) 55 controls a key input from a keyboard 59 or a pointing device (not known). A CRT controller (CRTC) 56 controls a display on a CRT display (CRT) 60. A disk controller (DKC) 57 controls an access to the external memory 61 such as hard disk (HD) or floppy disk (FD) to store a boot program, various applications, font data, a user file, an edit file, printer control command generating program (hereinafter, referred to as a printer driver), and the like. A printer controller (PRTC) 58 is connected to a printer 1500 through a bidirectional interface (interface) 71 and executes a communication control process with the printer 1500.

The CPU 51 executes, for example, a developing (rasterizing) process of an outline font into a display information RAM set on the RAM 52, thereby enabling WYSIWYG (What you see is what you get) to display the same image as an image which is printed onto the CRT 60. The CPU 51 opens various registered windows on the basis of commands instructed by a mouse cursor or the like (not shown) on the CRT 60 and executes various data processes. When the printing is executed, the user can open a window regarding the setting of the print and set a print processing method for a printer driver including the setting of a printer and the selection of a printing mode.

The printer 1500 is controlled by a CPU 62. The printer CPU 62 generates an image signal as output information to a printing unit (printer engine) 67 connected to a system bus 65 on the basis of a control program or the like stored in a program ROM of an ROM 63 or a control program or the like stored in an external memory 64. The control program or the like of the CPU 62 is stored in the program ROM of the ROM 63. Font data or the like which is used when the output information is generated is stored in a font ROM of the ROM 63. In case of a printer without the external memory 64 such as a hard disk, information or the like which is used on the host computer is stored in a data ROM of the ROM 63.

The CPU 62 can perform a communicating process with the host computer via an input unit 68 and notify the host computer 3000 of information or the like in the printer. An RAM 69 is an RAM functioning as a main memory, a work area, or the like of the CPU 62 and can expand a memory capacity by an option RAM which is connected to an expansion port (not shown). The RAM 69 is used as an output information developing area, an environment data storing area, an NVRAM, or the like. An access to the external memory 64 such as hard disk (HD), IC card, or the like is controlled by a memory controller (MC) 70. The external memory 64 is connected as an option and stores font data, an emulation program, form data, and the like. Reference numeral 68 denotes the foregoing operation panel on which switches for the operation, an LED display, and the like are arranged.

As for the external memory 64, the number of external memories 64 is not limited to one but a plurality of external memories 64 are provided. A plurality of option cards including built-in fonts and a plurality of external memories in which programs to interpret printer control languages of different language systems have been stored can be connected. Further, the apparatus can have an NVRAM (not shown) and store printer mode set information from an operation panel 1501.

Figure 2:
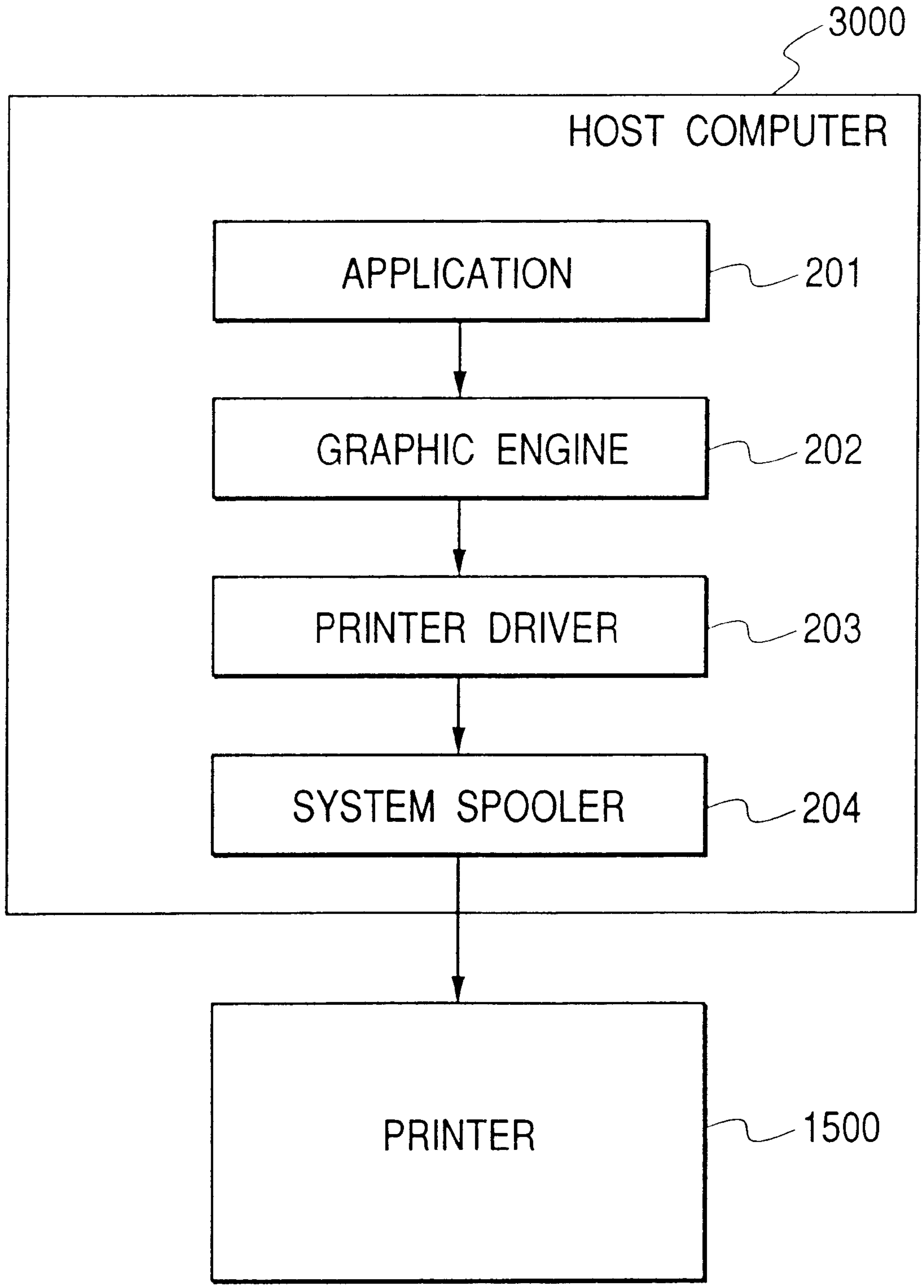
FIG. 2 is a block diagram of a typical print system of a host computer to which a printer is connected.

FIG. 2 is a constructional diagram of a typical printing process in the host computer to which the printing apparatus such as a printer is directly connected or connected via a network.

An application 201, a graphic engine 202, a printer driver 203, and a system spooler 204 exist as files stored in the external memory 61 and are program modules which are loaded into the RAM 52 and executed by the OS or a module using such modules when they are executed. The application 201 and printer driver 203 can be added to the FD of the external memory 61 or a CD-ROM (not shown) or to the HD of the external memory 61 via the network (not shown).

The application 201 stored in the external memory 61 is loaded into the RAM 52 and executed. However, when the printing is performed by the printer 1500 from the application 201, an output (drawing) is performed by using the graphic engine 202 which has similarly been loaded in the RAM 52 and can be executed.

The graphic engine 202 similarly loads the printer driver 203 prepared every printing apparatus from the external memory 61 into the RAM 52 and converts the output of the application 210 into a control command of the printer by using the printer driver 203. The converted printer control command is outputted by the OS to the printer 1500 via the interface 71 through the system spooler 204 loaded in the RAM 52.

Processes in FIG. 2 will be specifically explained. For example, in the Windows (tradename of Microsoft Co., Ltd. in U.S.A.) OS, the application outputs data to a GDI (Graphic Device Interface) as a graphic engine by a format called a GDI function. The GDI outputs the data of the GDI function inputted from the application to the printer driver by a format called a DDI function (Device Driver Interface) suitable for the printer driver on an output destination side. On the basis of the DDI function received from the GDI, the printer driver generates print data comprising a printer control command which can be interpreted by the printer and transmits it to the system spooler. The print data will be described on the assumption that it includes data in a range from an advanced control command like a page description language to low level data of a binary format. The system spooler divides the printer control command inputted from the printer driver into data of tens of kilobytes and transmits the data to the printer on a divided file unit basis.

Figure 3:
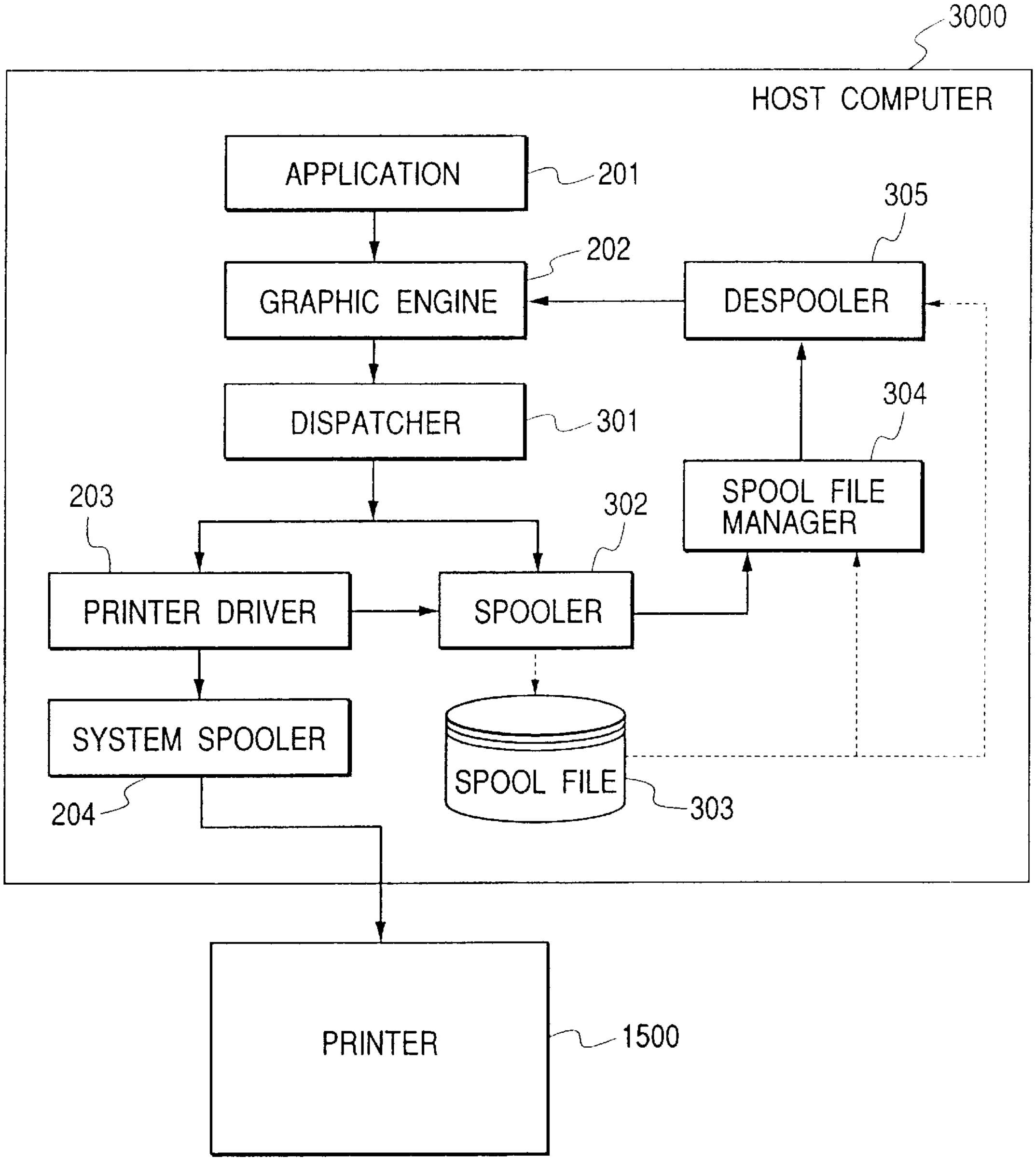
FIG. 3 is a block diagram of a print system for temporarily spooling a print command from an application as a spool file.

In addition to the print system comprising the printer and the host computer shown in FIG. 2, a print system of the embodiment further has a construction such that the print data from the application is once spooled by intermediate code data before the printer control command is generated as shown in FIG. 3.

FIG. 3 shows a system obtained by expanding the system of FIG. 2 and has a construction such that a spool file 303 comprising intermediate codes is once generated when a print command (DDI function) is sent from the graphic engine 202 to the printer driver 203. In the system of FIG. 2, the application 201 is released from the printing process at a point when the printer driver 203 finishes the conversion of all of the print commands from the graphic engine 202 into the control commands of the printer. In the system of FIG. 3, the application 201 is released from the printing process at a point when a spooler 302 converts all of the print commands into intermediate code data and outputs it to the spool file 303. Usually, the processes in the latter one are finished in a shorter time. In the system shown in FIG. 3, the contents in the spool file 303 can be modified. Thus, a function which the application does not have such that the print data from the application is zoomed, a plurality of pages are reduced into one page and printed, or the like can be realized.

For those purposes, according to the invention, the system of FIG. 2 is expanded so as to spool by the intermediate code data as shown in FIG. 3. To modify the print data, it is usually set from a window (FIG. 10) provided by the printer driver 203 and the printer driver 203 stores the set contents into the RAM 52 or external memory 61.

The details of FIG. 3 will now be described hereinbelow. As shown in the diagram, according to the expanded processing system, a dispatcher 301 hooks and receives the print command from the graphic engine 202. A check is made to see if a drawing function as a print command received by the dispatcher 301 from the graphic engine 202 has been issued from the application 201 or issued from a despooler 305. In case of the print command issued from the application 201 to the graphic engine 202, the dispatcher 301 loads the spooler 302 stored in the external memory 61 into the RAM 52 and sends the print command to the spooler 302 instead of the printer driver 203.

The spooler 302 interprets the drawing function as a received print command, converts it from the spooler 302 into intermediate codes which can be modified in the system of the despooler 305, and outputs them to the spool file 303. The spooler 302 obtains modification set information regarding the print data which has been set in the window of FIG. 10 from the printer driver 203 and stores it into the spool file 303. Although the spool file 303 is formed as a file on the external memory 61, it can be formed on the RAM 52.

Further, the spooler 302 loads a spool file manager 304 stored in the external memory 61 into the RAM 52 and notifies the spool file manager 304 of a forming situation of the spool file 303. After that, the spool file manager 304 discriminates whether the print can be performed or not in accordance with the modification set contents which has been stored in the spool file 303 and which is concerned with the print data. In this discrimination, for example, when the modification set information of the printer driver indicates the setting of a 4-up print, a check is made to see if intermediate data of four logical pages has been spooled in the spool file 303. When the modification set information of the printer driver indicates the setting of a reverse order print, whether the final page has been spooled or not is discriminated.

When the spool file manager 304 determines that the print can be performed by using the graphic engine 202, the despooler 305 stored in the external memory 61 is loaded into the RAM 52 and the despooler 305 is instructed so as to perform a printing process of intermediate codes described in the spool file 303.

The despooler 305 modifies the intermediate codes included in the spool file 303 in accordance with the modification set information included in the spool file 303, converts them into a drawing function (GDI function) as a print command, and outputs it again via the graphic engine 202 (GDI).

When the print command received by the dispatcher 301 from the graphic engine 202 is a print command issued from the despooler 305 to the graphic engine 202, the dispatcher 301 sends a drawing function (DDI function) as a print command to the printer driver 203 instead of the spooler 302.

On the basis of the drawing function (DDI function), the printer driver 203 generates a printer control command of a page description language format represented by LIPS (registered trade name of Canon Inc.), PCL, or the like and outputs it to the printer 1500 via the system spooler 204.

In the invention, although the printer driver 203 has been described with respect to, particularly, the portion to generate the page description language from the DDI function, a construction of the dispatcher, spooler, spool file manager, despooler, and printer river is also called a printer driver in combination. This is because the printer driver relates to the portion which is provided by a printer vendor and, generally, not only the portion to generate the PDL but also the portion which is provided by the printer vendor is called a printer driver in a lump. Therefore, particularly, in case of showing the portion to generate the page description language from the DDI function, reference numeral is added like a printer driver 203 and explanation will be made.

<Construction of Color Laser Beam Printer>

Figure 4:
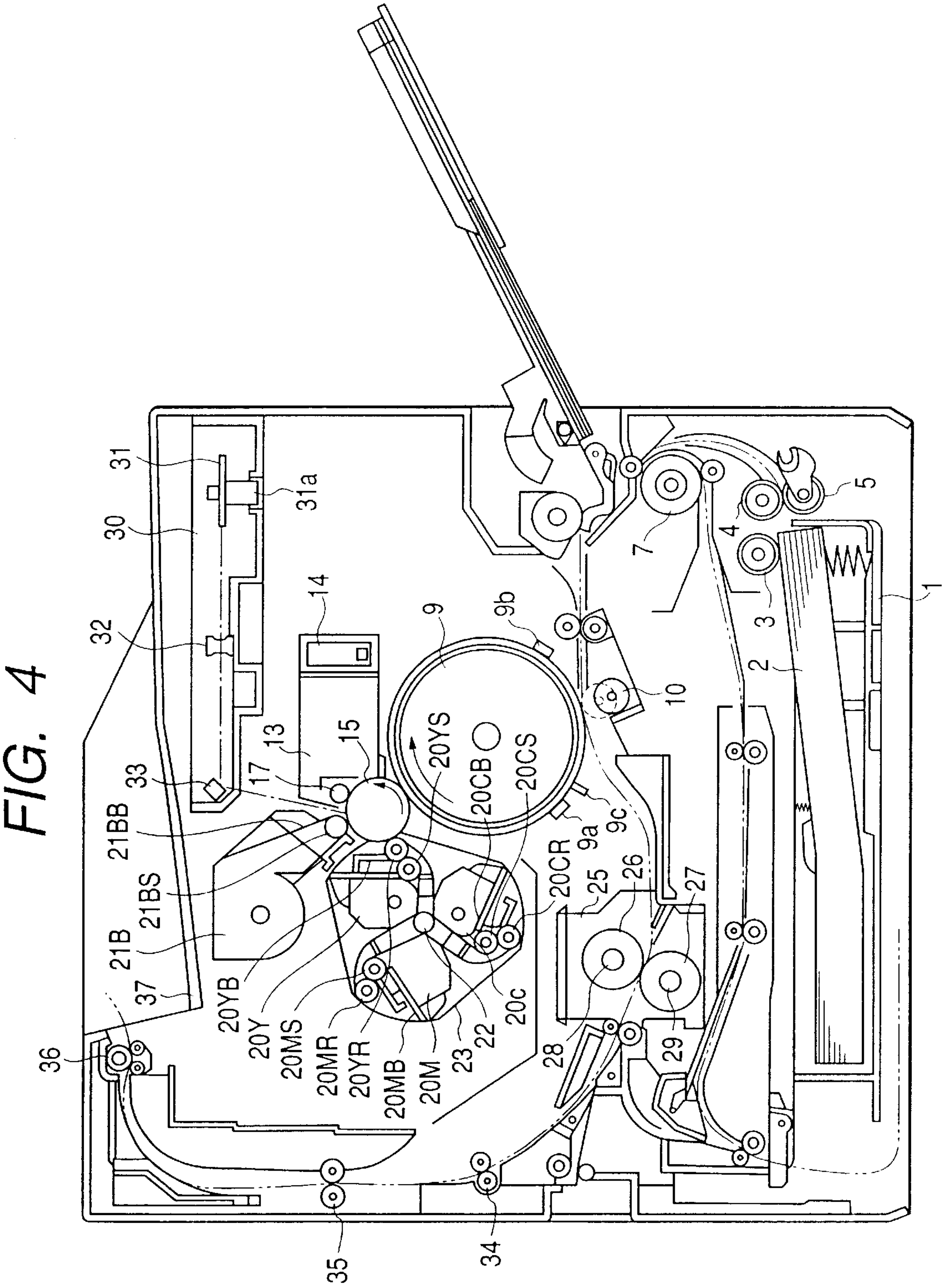
FIG. 4 is a cross sectional view of a color laser beam printer.

FIG. 4 is a cross sectional view of a color laser printer having a both-side printing function as an example of the printer 1500. According to this printer, a laser beam modulated by image data of each color obtained on the basis of the print data inputted from the host computer 3000 is scanned onto a photosensitive drum 15 by a polygon mirror 31, thereby forming an electrostatic latent image. A visible image is obtained by developing the electrostatic latent image by toner. A color visible image is formed by multiplexingly transferring the visible images with respect to all colors onto an intermediate transfer material 9. Further, the color visible image is transferred onto a transfer material 2 and fixed thereon. An image forming unit for performing a control as mentioned above is constructed by: a drum unit having the photosensitive drum 15; a primary charging unit having a contact charging roller 17; a cleaning unit; a developing unit; the intermediate transfer material 9; a paper feeding unit including a paper cassette 1 and various rollers 3, 4, 5, and 7; a transfer unit including a transfer roller 10; and a fixing unit 25.

The drum unit 13 is formed by integratedly constructing the photosensitive drum (photosensitive material) 15 and a cleaner vessel 14 having a cleaning mechanism also functioning as a holder of the photosensitive drum 15. The drum unit 13 is detachably supported to a printer main body and can be easily exchanged in accordance with a service life of the photosensitive drum 15. The photosensitive drum 15 is constructed by coating an organic photoconductive layer onto the peripheral surface of an aluminum cylinder and rotatably supported to the cleaner vessel 14. A driving force of a driving motor (not shown) is transferred to the photosensitive drum 15, so that the drum 15 rotates. The driving motor rotates the photosensitive drum 15 counterclockwise in accordance with the image forming operation. By selectively exposing the surface of the photosensitive drum 15, the electrostatic latent image is formed. In a scanner unit 30, the modulated laser beam is reflected by the polygon mirror which is rotated by a motor 31*a* synchronously with a horizontal sync signal of an image signal and is irradiated onto the photosensitive drum via a lens 32 and a reflecting mirror 33.

In order to visualize the electrostatic latent image, the developing unit has a construction comprising: three color developers 20Y, 20M, and 20C to perform development of yellow (Y), magenta (M), and cyan (C); and one black developer 21B to perform development of black (B). Sleeves 20YS, 20MS, 20CS, and 21BS and coating blades 20YB, 20MB, 20CB, and 21BB adapted to be come into pressure contact with the peripheral surfaces of the sleeves 20YS, 20MS, 20CS, and 21BS are provided for the color developers 20Y, 20M, and 20C, and black developer 21B, respectively. Coating rollers 20YR, 20MR, and 20CR are provided for the three color developers 20Y, 20M, and 20C, respectively.

The black developer 21B is detachably attached to the printer main body. The color developers 20Y, 20M, and 20C are detachably attached to a developing rotary 23 which rotates around a rotary shaft 22 as a center, respectively.

The sleeve 21BS of the black developer 21B is arranged for the photosensitive drum 15 so as to have a micro interval of, for example, about 300 μm between them. The black developer 21B conveys the toner by a feeding member built therein and applies charges to the toner by frictional charging so as to coat the toner onto the peripheral surface of the sleeve 21BS rotating clockwise by the coating blade 21BB. By applying a developing bias to the sleeve 21BS, development is performed to the photosensitive drum 15 in accordance with the electrostatic latent image, thereby forming a visible image by the black toner onto the photosensitive drum 15.

Three color developers 20Y, 20M, and 20C rotate in association with the rotation of the developing rotary 23 upon image formation. A predetermined one of the sleeves 20YS, 20MS, and 20CS faces the photosensitive drum 15 with a micro interval of about 300 μm. Thus, the predetermined one of the color developers 20Y, 20M, and 20C stops at the developing position which faces the photosensitive drum 15 and a visible image is formed on the photosensitive drum 15.

When the color image is formed, the developing rotary 23 rotates every rotation of the intermediate transfer material 9, the developing steps are executed in accordance with the order of the yellow developer 20Y, magenta developer 20M, cyan developer 20C, and black developer 21B. The intermediate transfer material 9 rotates four times and visible images by the yellow, magenta, cyan, and black toner are sequentially formed. Thus, a full color visible image is formed on the intermediate transfer material 9.

The intermediate transfer material 9 is come into contact with the photosensitive drum 15 and rotates in association with the rotation of the photosensitive drum 15, rotates clockwise at the time of color image formation, and is subjected to a multiplex transfer of the visible images of four times from the photosensitive drum 15. When the transfer roller 10, which will be explained hereinlater, is come into contact with the intermediate transfer material 9 upon image formation and sandwiches and conveys the transfer material 2, the intermediate transfer material 9 simultaneously multiplexingly transfers the color visible images on the intermediate transfer material 9 onto the transfer material 2. A TOP sensor 9*a* and an RS sensor 9*b* to detect the position of the intermediate transfer material 9 in the rotating direction and a density sensor 9*c* to detect a density of the toner image transferred to the intermediate transfer material are arranged in the outer peripheral portion of the intermediate transfer material.

The transfer roller 10 has a transfer charging device supported to the photosensitive drum 15 so as to be come into contact with and removed from it and is formed by winding a metal axis by a foaming elastic material of a middle resistance.

The transfer roller 10 is downwardly away from the intermediate transfer material 9 so as not to disturb the color visible images while the color visible images are being multiplexingly transferred onto the intermediate transfer material 9 as shown by a solid line in FIG. 4. After the color visible images of four colors were formed on the intermediate transfer material 9, the transfer roller 10 is positioned upward shown by a broken line in the diagram by a cam member (not shown) at a timing of transferring them onto the transfer material 2. Thus, the transfer roller 10 is come into pressure contact with the intermediate transfer material 9 through the transfer material 2 by a predetermined pressing force and a bias voltage is applied to the roller 10. The color visible images on the intermediate transfer material 9 are transferred onto the transfer material 2.

The fixing unit 25 fixes the transferred color visible images while conveying the transfer material 2 and has: a fixing roller 26 to heat the transfer material 2; and a pressurizing roller 27 to allow the transfer material 2 to be come into pressure contact with the fixing roller 26. The fixing roller 26 and pressurizing roller 27 are formed in a hollow shape and have therein heaters 28 and 29, respectively. That is, the transfer material 2 holding the color visible images is conveyed by the fixing roller 26 and pressurizing roller 27. By applying a heat and a pressure to the color visible images, the toner is fixed on the surface.

After the visible images were fixed, the transfer material 2 is ejected to a paper ejecting portion 37 by paper ejection rollers 34, 35, and 36 and the image forming operation is finished. Cleaning means cleans the toner remaining on the photosensitive drum 15 and intermediate transfer material 9. The drain toner after the visible images by the toner formed on the photosensitive drum 15 were transferred onto the intermediate transfer material 9 or the drain toner after the color visible images of four colors formed on the intermediate transfer material 9 were transferred onto the transfer material 2 is stored into the cleaner vessel 14.

The transfer material (recording paper) 2 to be printed is taken out of the paper feed tray 1 by the paper feed roller 3 and is conveyed so as to be sandwiched between the intermediate transfer material 9 and transfer roller 10, so that a color toner image is recorded. The toner image passes through the fixing unit 25 and is fixed. In a one-side printing mode, a guide 38 forms a conveying path so as to guide the recording paper to an upper paper ejecting portion. However, in a both-side printing mode, the guide 38 forms a path so as to guide the recording paper to a lower both-side unit.

The recording paper guided to the both-side unit is once fed to a lower portion (conveying path shown by an alternate long and two-short dashes line) of the tray 1 by a conveying roller 40 and, thereafter, conveyed in the opposite direction and sent to a both-side tray 39. The front/reverse sides of the paper on the both-side tray 39 are opposite to those in a state where the paper is put on the paper feed tray 1. The forward/backward conveying directions of the paper on the both-side tray are opposite to those in the state where the paper is put on the paper feed tray 1. In this state, by performing again the transfer and fixing of the toner image, the both-side print can be performed.

Although the embodiment will be described on the assumption that a color laser printer of the intermediate transfer system is used as a printing apparatus, the invention is not limited to it. The invention can be applied to a printing apparatus of any of a transfer drum system, a transfer belt system, and further, an intermediate transfer belt system.

<Generating Process of Spool File>

Figure 5:
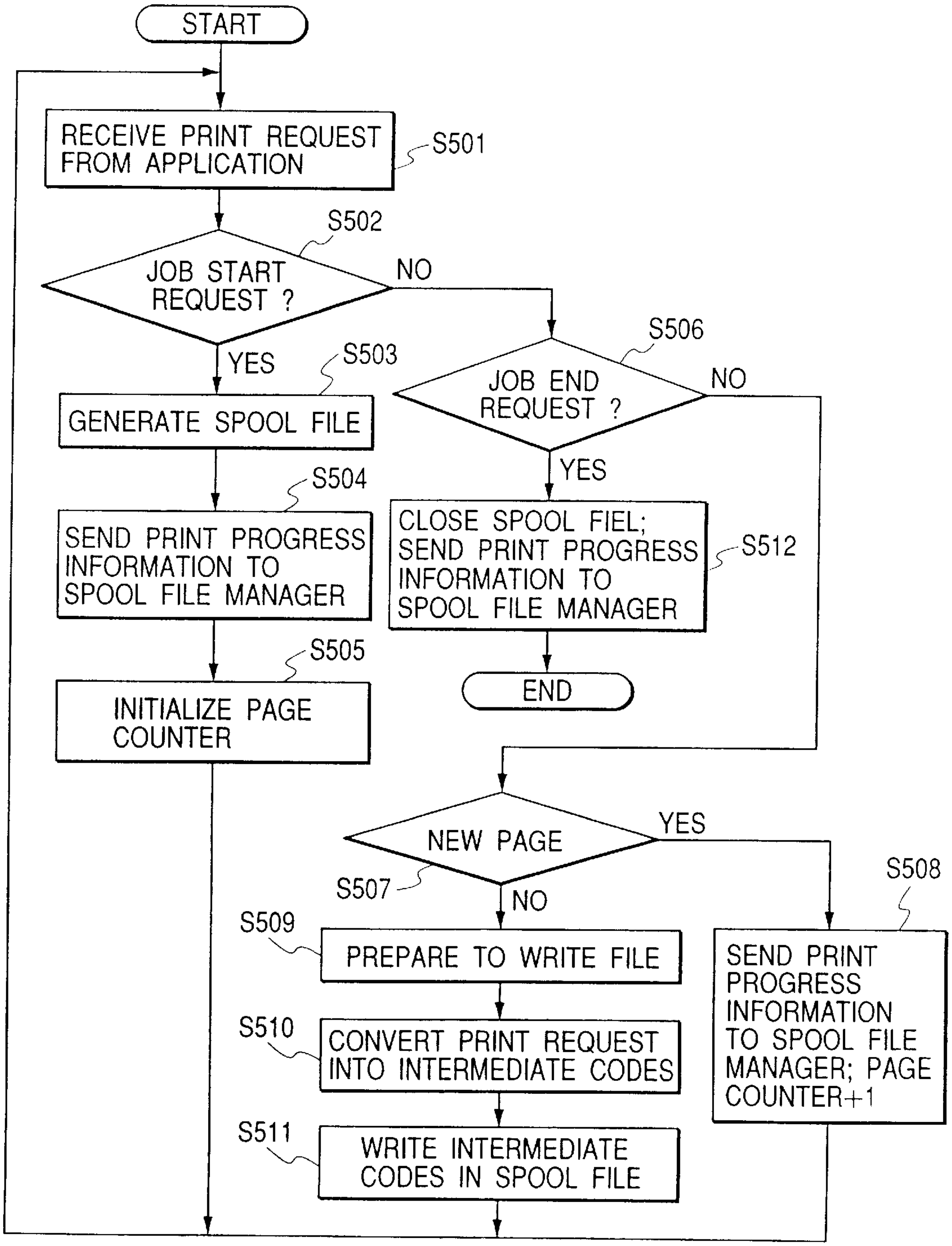
FIG. 5 is a flowchart for a spooling process in a spooler 302.

FIG. 5 shows a flowchart for a page unit storing process in the spooler 302 when the spool file 303 is generated.

Figure 10:
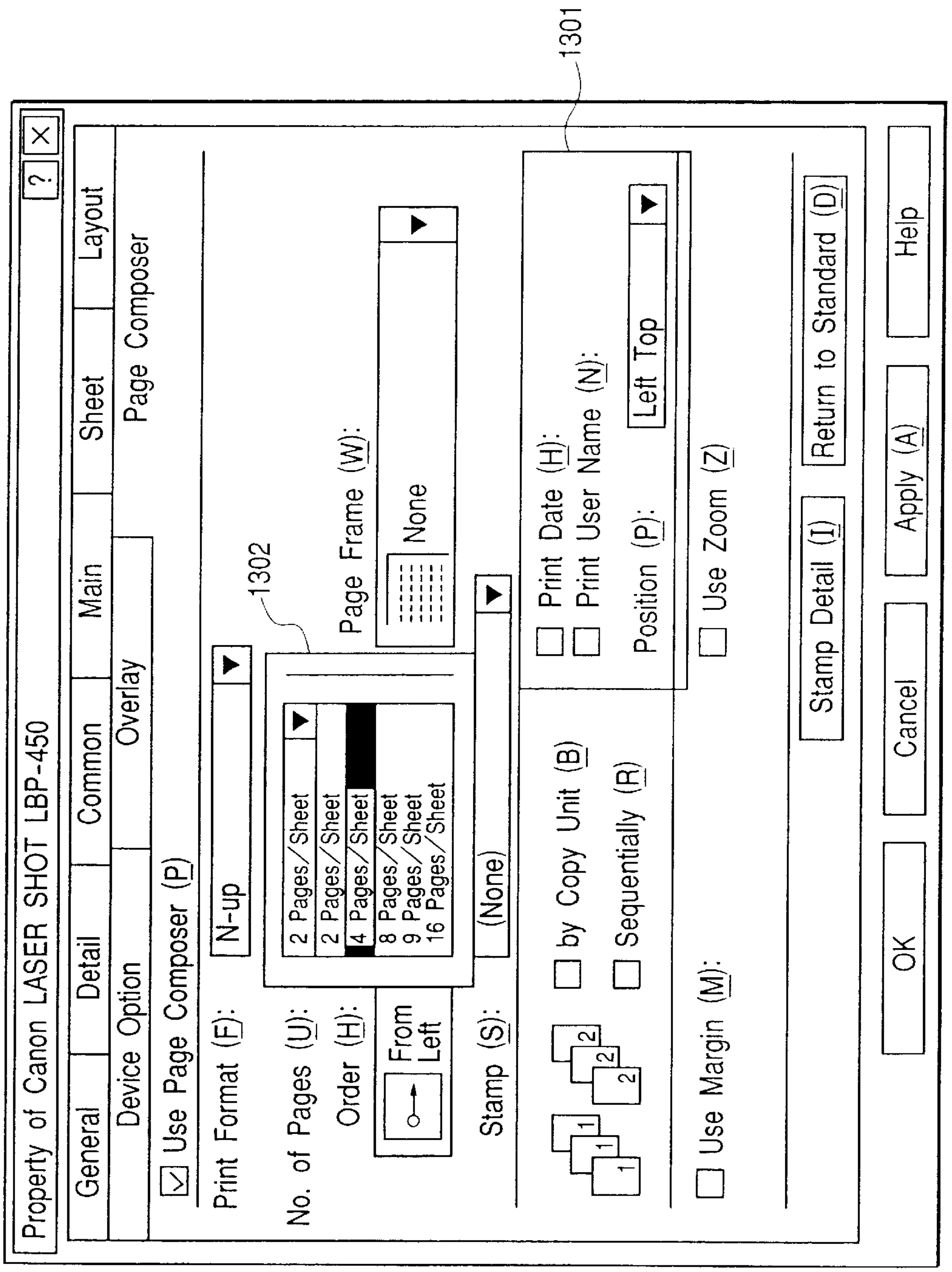
FIG. 10 is a diagram showing an example of a picture plane to set a print.
Figure 11:
FIG. 11 is a diagram showing an example of a picture plane to set an additional drawing.
Figure 13:
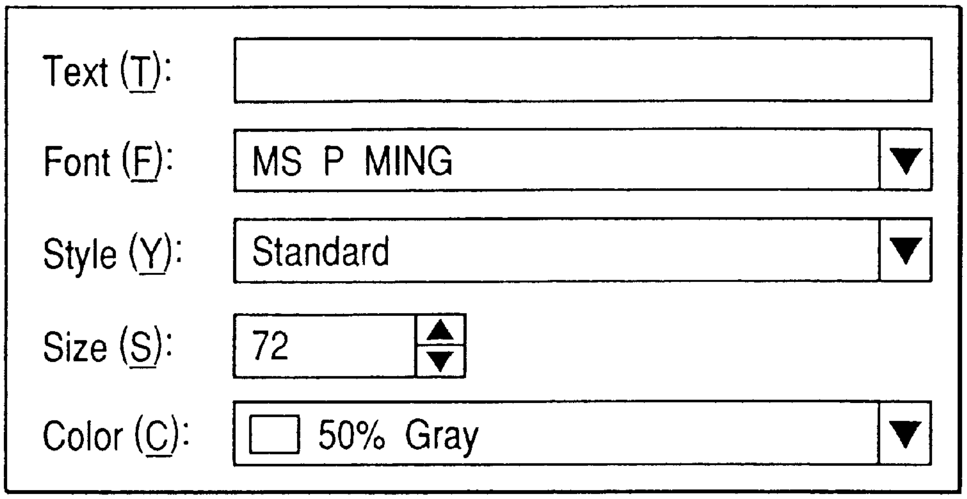
FIG. 13 is a diagram showing an example of a picture plane to set an additional drawing.

First in step S501, when a print request from the application is received, the dispatcher 301 receives the drawing function generated from the graphic engine 202 and sends it to the spooler 302. In the application, a dialog to input a print setting as shown in FIGS. 10, 11, and 13 which is previously provided by the printer driver is displayed, the print setting is inputted from the dialog, and the spooler 302 obtains the print setting from the printer driver at a timing when the print request is received from the application. The set input dialog shown in FIG. 10 includes: a set item like an item 1301 to set the contents of the additional information and the drawing position thereof; and a modification set item like an item 1302 to decide the number of logical pages which are laid out in one physical page.

Figure 12:
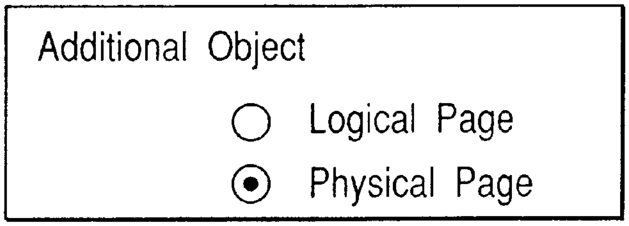
FIG. 12 is a diagram showing an example of a picture plane to set an additional drawing.

As shown in FIG. 12, the setting to select whether an object which is drawn in accordance with the additional information is added to a page from the application, namely, a logical page or added to a sheet to be outputted, namely, a physical page reconstructed by reducing and laying out a plurality of logical pages is also effective to each object which is additionally drawn. Further, a character train, a font, a style, a size, a color, and the like to be additionally drawn as shown in FIG. 13 can be designated.

Figure 8:
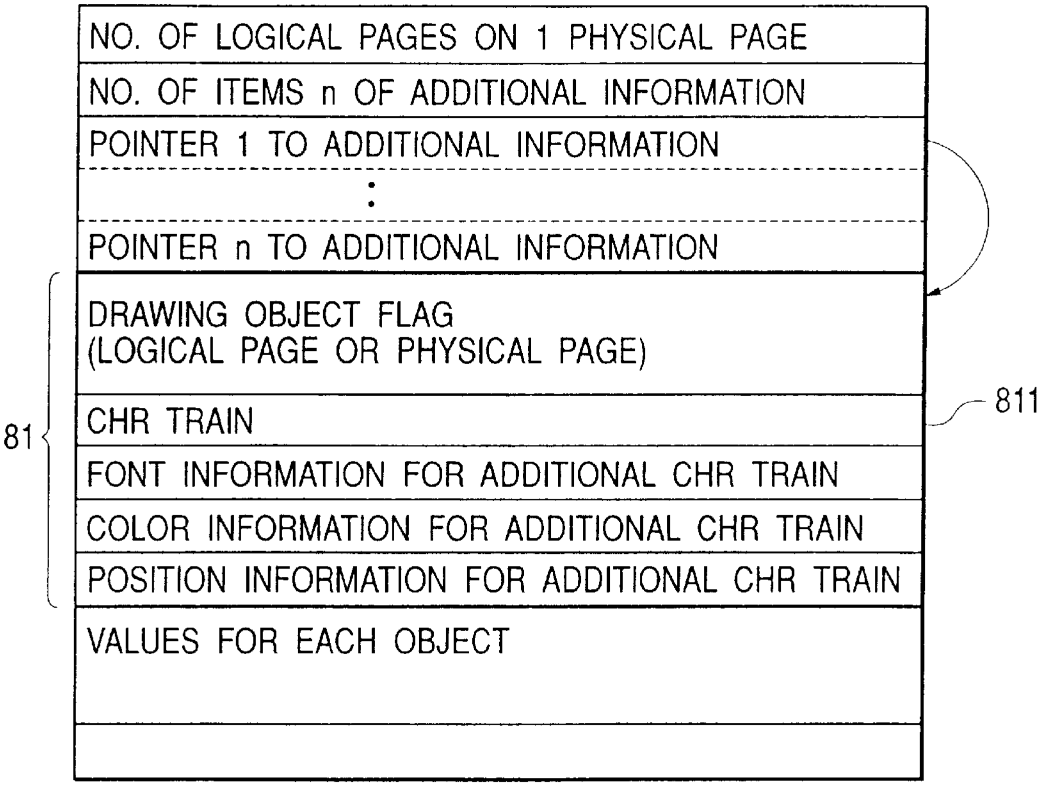
FIG. 8 is a diagram showing an example of a data format of additional drawing information.

The values set by those setting dialogues are stored into the spool file 303 in a format as shown in, for example, FIG. 8 and read out by the following processes and the relevant processes are executed. In FIG. 8, an area 81 becomes a unit of the additional information. The information which is set in FIGS. 10 to 13 is stored into the area 81. In a block 811 to store character trains in the area 81, a page number, a user name, a date, and the like can be outputted by a combination of a predetermined control character train such as a "¥" mark and subsequent characters. FIG. 14 shows an example of the control character train. The details of the additional drawing will be explained hereinlater.

In step S502, the spooler 302 discriminates whether the print request received in step S501 is a job start request or not. If it is determined that the print request is the job start request, step S503 follows and the spool file 303 to temporarily store the intermediate data is formed.

In step S504, the spooler 302 sends print progress information indicating that the spooling process of which number of logical page is being executed to the spool file manager 304. In subsequent step S505, a page number counter of the spooler 302 is initialized. In the spool file manager 304, information of a job, a modification setting, or the like for the job in which the printing was started is read out from the spool file 303 and stored.

When it is determined in step S502 that the print request is not the job start request, step S506 follows. In step S506, the spooler 302 discriminates whether the received request is a job end request or not. When it is determined that the received request is not the job end request, step S507 follows and whether the received request indicates a new page or not is discriminated. If the new page is decided in step S507, step S508 follows and the spooler 302 notifies the spool file manager 304 of the print progress information and increases the page number counter by "1".

When it is determined in step S507 that the received print request does not indicate the new page, step S509 follows and the spooler 302 prepares to write an intermediate file.

In subsequent step S510, the spooler 302 performs a converting process to store the drawing function obtained from the graphic engine 202 as intermediate data into the spool file 303 by the print request. In step S511, the spooler 302 writes the print request converted into the intermediate data in a form which can be stored in step S510 into the spool file 303. After that, the processing routine is returned to step S501 and the print request from the application is received again. The series of processes in steps S501 to S511 is continued until the job end request is received from the application.

When the spooler 302 determines in step S506 that the print request from the application indicates the job end, since all of the print requests from the application have been finished, step S512 follows. The print progress information is notified to the spool file manager 304 and the processing routine is finished.

<Management of Spool Files>

Figure 6:
FIG. 6, composed of FIGS. 6A and 6B, is a flowchart for a print control process in a spool file manager 304.
Figure 6A:
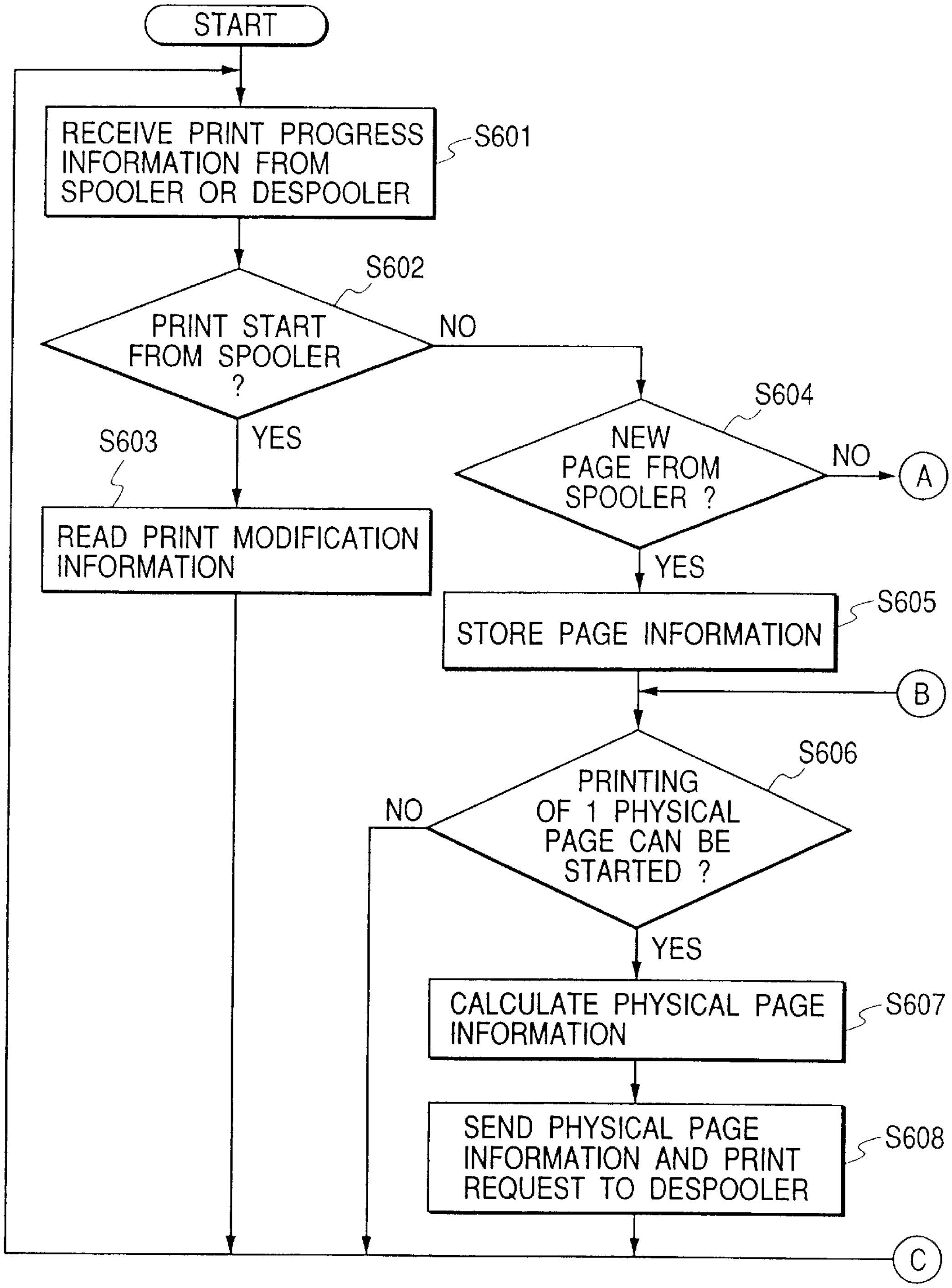
Figure 6B:
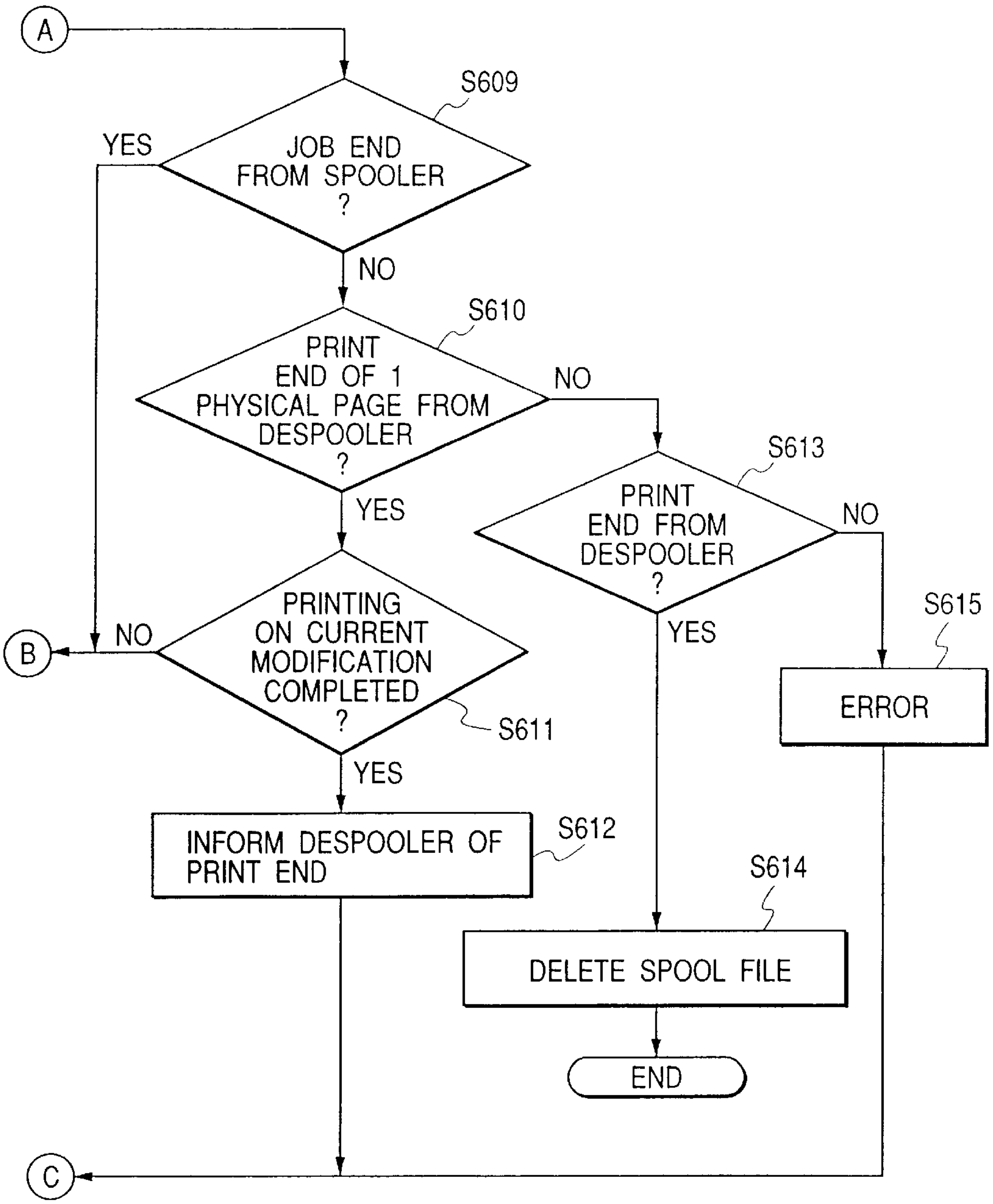

FIGS. 6A and 6B are flowcharts showing the details of a control between the process to generate the spool file 303 and a print data generating process, which will be explained hereinlater, in the spool file manager 304.

In step S601, the spool file manager 304 receives the print progress information from the spooler 302 or despooler 305.

In step S602, a check is made to see if the print progress information is print start information which is notified from the spooler 302 in step S504 in FIG. 5. If YES, step S603 follows and the modification set information of the print is read out from the spool file 303 and the job management is started. Thus, the spool file manager 304 can understand in which state the print job which is being processed has been set and can discriminate whether the modifying process can be performed at which timing. For example, when the N-up print is designated, only after the intermediate data of the N logical pages in one physical page was stored in the spool file 303, the spool file manager 304 can execute the modifying process of the intermediate data and an outputting process of the despooler 305.

If the received print request is not the print start information from the spooler 302 in step S602, step S604 follows. The spool file manager 304 discriminates whether the print progress information indicates print end information of one logical page from the spooler 302 which is notified in step S508 or not. If it is the print end information of one logical page, step S605 follows and the logical page information for such a logical page is stored. In subsequent step S606, the spool file manager 304 discriminates whether the print of one physical page can be started or not for the N logical pages in which the spooling has been finished at this time point. When it can be printed, step S607 follows and the physical page number is determined from the number of logical pages which are assigned to one physical page to be printed.

With respect to the calculation of the physical page, for example, in case of setting so as to arrange four logical pages to one physical page, the first physical page can be printed at a point when the fourth logical page is spooled, and it is outputted as a first physical page. Subsequently, the second physical page an be printed at a point when the eighth logical page is spooled.

Even if the total number of logical pages is not equal to a multiple of the number of logical pages to be arranged in one physical page, the logical page to be arranged in one physical page can be determined by spool end information in step S512.

Figure 9:
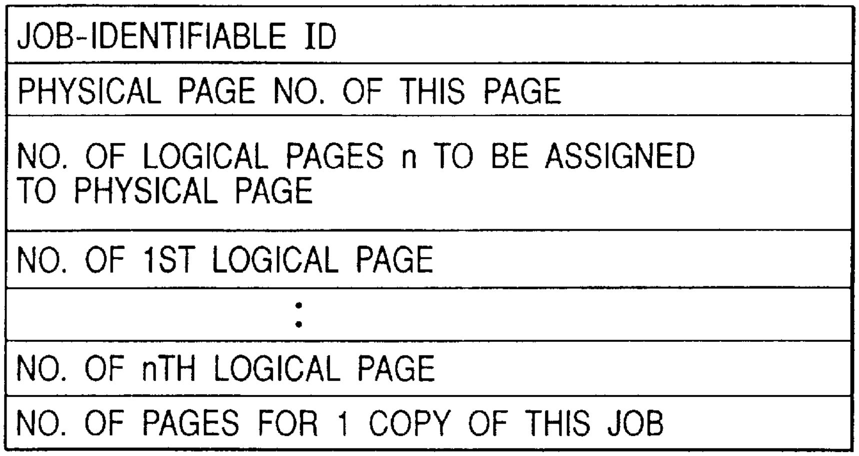
FIG. 9 is a diagram showing an example of a data format which is sent when a print request for a physical page is sent from the spool file manager 304 to the despooler 305.

In step S608, the spool file manager 304 generates the logical page number constructing the physical page which can be printed and the information such as a physical page number or the like in accordance with a format as shown in FIG. 9 and notifies the despooler 305 of them. After that, the processing routine is returned to step S601 and next information is waited for. In the embodiment, the printing process can be performed even if all of the spools of the print job are not finished at a point when the logical page constructing one page of the print data, namely, one physical page is spooled.

In step S604, when the print progress information does not indicate the print end information of one logical page from the spooler 302, step S609 follows. The spool file manager 304 discriminates whether it is the job end information from the spooler 302 which is notified in step S512 or not. When it is the job end information, step S606 follows. When it is not the job end information, step S610 follows and a check is made to see if the received print progress information indicates the print end information of one physical page from the despooler 305. When it is the print end information of one physical page, step S611 follows and a check is made to see if all of the prints in the current modification setting have been finished. If YES, step S612 follows and the print end is notified to the despooler 305. When it is decided that the print is not finished yet, step S606 follows. In the despooler 305 in the embodiment, it is assumed that the number of physical pages in which the printing process can be performed in a lump is equal to 1.

When it is decided in step S610 that the received print progress information does not indicate the print end information of one physical page from the despooler 305, step S613 follows and a check is made to see if it is the print end information from the despooler 305. When it is decided that the information indicates the print end information from the despooler 305, step S614 follows, the spool file 303 is deleted, and the processing routine is finished. When it is not the print end information from the despooler 305, step S615 follows, another ordinary process is executed, and next information is waited for.

<Despooling Process>

Figure 7:
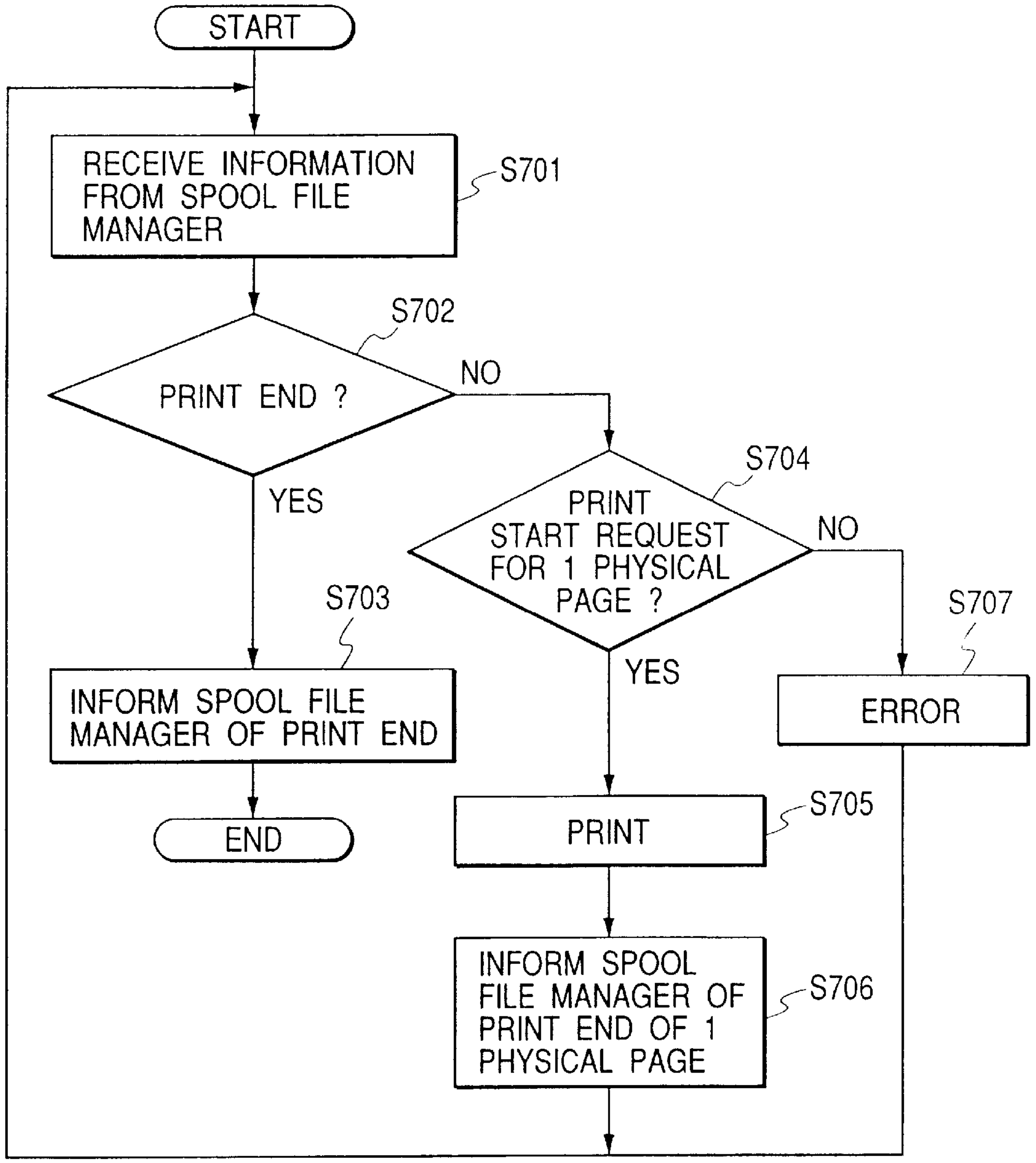
FIG. 7 is a flowchart for a process in a despooler 305.

FIG. 7 is a flowchart showing the details of the print data generating process in the despooler 305.

In response to a print request from the spool file manager 304, the despooler 305 reads out the necessary information from the spool file 303 and generates the print data. A method of transferring the generated print data to the printer is as described in FIG. 3.

In the despooler 305, first in step S701, the information from the spool file manager 304 mentioned above is inputted. In subsequent step S702, the despooler 305 discriminates whether inputted information is end information of the job or not. If it is the job end information, step S703 follows and processing end information of the despooler 305 is notified to the spool file manager 304 and the processing routine is finished. When it is not the job end information in step S702, step S704 follows and a check is made to see if the print start request of one physical page in step S608 mentioned above has been notified. When it is determined that the print start request of one physical page has been notified, step S705 follows. On the basis of the information shown in FIG. 9 sent from the spool file manager 304, information necessary to generate the print data of the designated physical page is read out from the spool file 303 and the printing process is performed.

In the printing process, the print request command stored in the spool file 303 is converted into a format which can be recognized by the graphic engine 202 in the despooler 305 and the converted command is transferred. With respect to the modification setting such that a plurality of logical pages are laid out in one physical page as shown in the embodiment, they are converted in consideration of a reduction arrangement in step S705. At this time point, the additional information stored in the spool file 303 in a format as shown in FIG. 8 is read out and the designated objects such as a page number and the like are added so as to be arranged at the designated positions on the sheet.

When the necessary printing process is finished, in subsequent step S706, the end of generation of the print data of one physical page is notified to the spool file manager 304. The processing routine is returned to step S701 and next information is waited for.

When it is determined in step S704 that the information is not the print start request, step S707 follows and another ordinary process is executed. The processing routine is returned to step S701 and next information is waited for.

FIGS. 15A and 15B are diagrams showing a difference between the case where the additional information has been added to the logical pages and the case where it has been added to the physical page with regard to an example in which the additional information is the page number. The position where the additional information is arranged and its contents differ depending on whether the flag in the area 81 as a drawing object in FIG. 8 indicates the logical page or the physical page.

In FIG. 15A, reference numeral 1801 denotes page numbers added to the logical pages in case of arranging four logical pages to one physical page. In this case, the page number is drawn in the lower center of an effective print area of each logical page.

In FIG. 15B, reference numeral 1802 denotes a page number added to a physical page. In this case, the page number is drawn in a lower center of an effective print area of the physical page.

<Additional Drawing Process of Additional Information>

In the following description, the page number is used as an example of the additional information and the additional drawing process of the additional information in step S705 in FIG. 7 will now be described further in detail with reference to a flowchart of FIG. 16.

In step S1901, as for the additional information stored in the spool file 303 in a format as shown in FIG. 8, the objects which are drawn in the physical page and the objects which are drawn in the logical pages are classified.

A counter is initialized in step S1902.

A check is made in step S1903 to see if a count value of the counter is equal to the preset number of logical pages per physical page. If the count value is equal to the number of logical pages, step S1908 follows. If it is not equal, step S1904 follows.

In step S1904, the count value is increased by "1".

In step S1905, the effective print area for the logical pages to be drawn from now on is calculated on the basis of the number of logical pages per page and the count value.

In step S1906, the current logical page number is read by using the count value as an index from the information regarding the physical page notified in a format as shown in FIG. 9 and the relevant logical page is reduced and drawn so as to be laid in the effective print area. When the N-page print is not designated, however, there is no need to reduce.

If the drawing object flag shown in FIG. 8 has been set to the logical page in step S1907, for the effective print area of the logical page calculated in step S1905, the object shown by the additional information is reduced and additionally drawn so as to be laid in the effective print area on the basis of the position information and the character train information. For example, in case of additionally drawing the page number for the logical page, the logical page number which is at present being drawn is drawn in this step.

After completion of the development of a predetermined number of logical pages as one physical page, step S1908 follows. In step S1908, if the drawing object flag shown in FIG. 8 has been set to the physical page, a character train or the like shown by the additional information is added to the effective print area of the physical page obtained from the application on the basis of the position information and the character train information. When the additional information is the page number for the physical page, it is sufficient to obtain the current physical page number received from the spool file manager in a format shown in FIG. 9 and additionally draw the obtained physical page number. An actual drawing process of the character train will be explained hereinlater.

Figure 16:
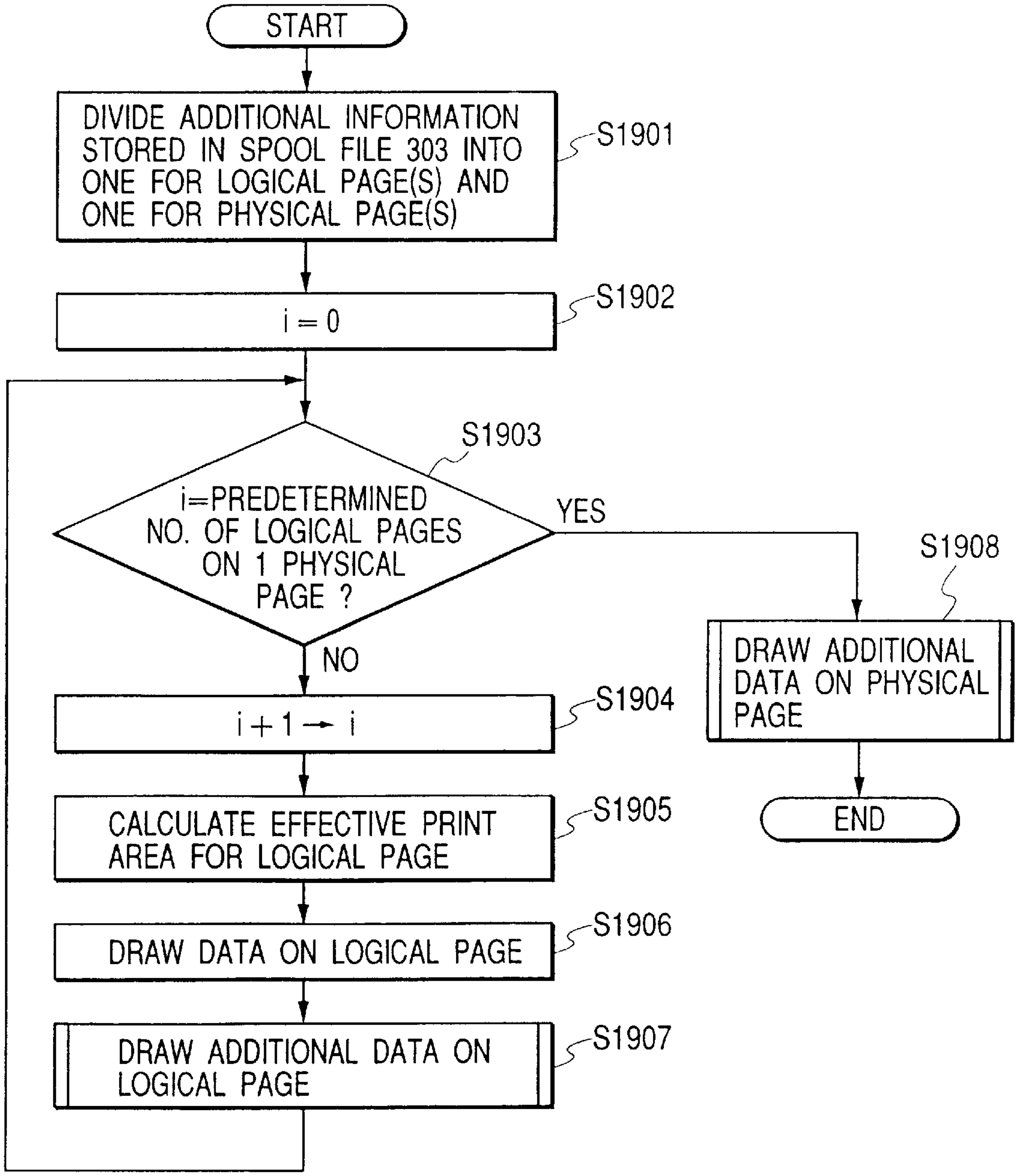
FIG. 16 is a flowchart for a printing process in the despooler 305.
Figure 17:
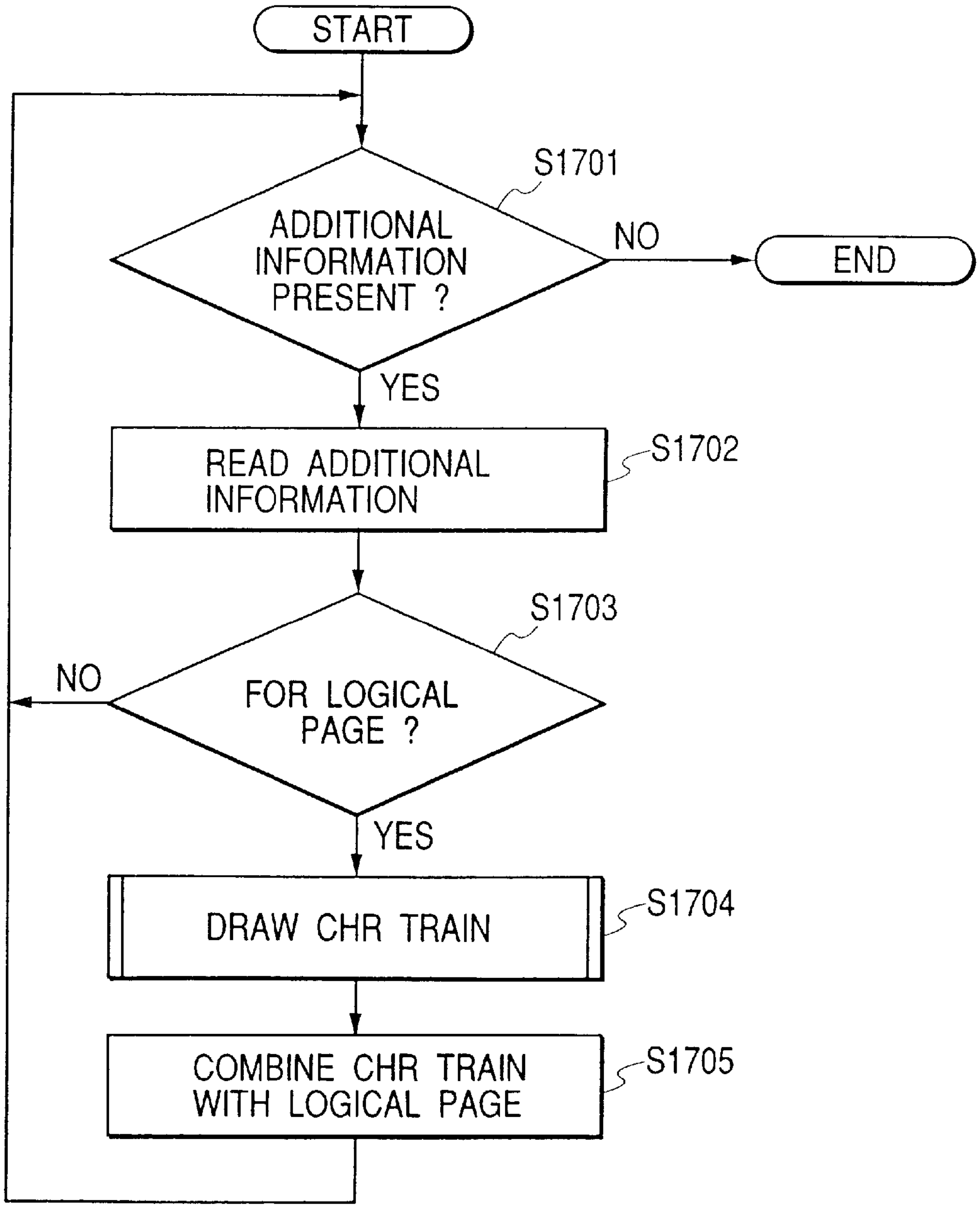
FIG. 17 is a flowchart for a process to combine the additional information with the logical page.

FIG. 17 is a flowchart for a process to combine the character train shown by the additional information with the logical page in step S1907 in FIG. 16.

First in step S1701, a check is made to see if there is any additional information which is not processed yet from the number of items of the additional information from the data in the format shown in FIG. 8. If YES, the additional information is read out by tracing the pointer in step S1702. In subsequent step S1703, the drawing object existing at the head of the read-out additional information is examined, thereby discriminating whether it is the logical page or not. If it is not the logical page, the remaining additional information is similarly processed. If it is the logical page, the character train is drawn in step S1704 by a procedure shown in FIG. 19. The character train is combined with the object logical page in step S1705. In the example, since the additional information has already been divided into the additional information for the logical pages as an object and the additional information for the physical page as an object in step S1901 in FIG. 16, a discrimination result in step S1703 is "YES".

Figure 18:
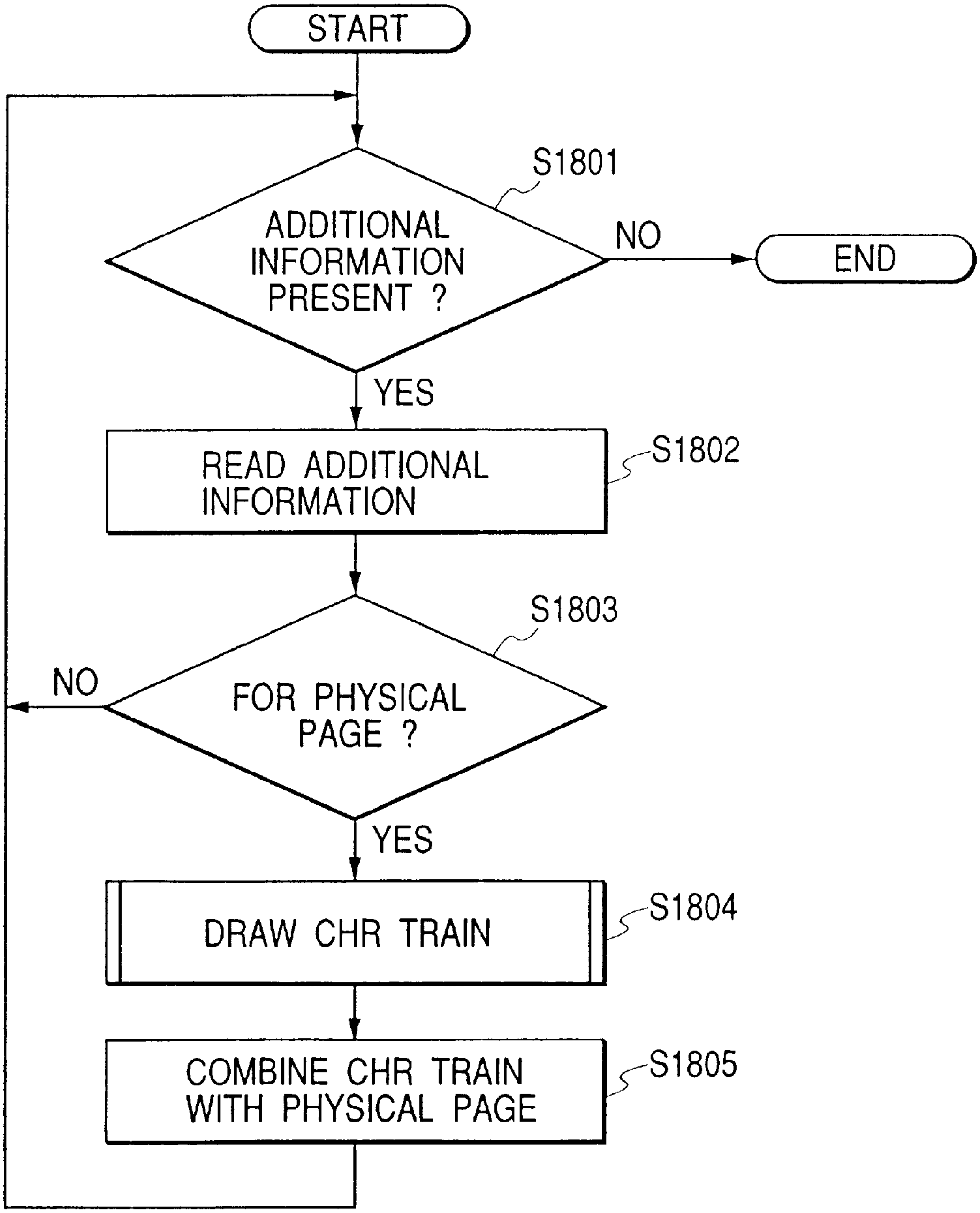
FIG. 18 is a flowchart for a process to combine the additional information with the physical page.

FIG. 18 is a flowchart for a process to combine the character train shown by the additional information with the physical page in step S1908 in FIG. 16. This procedure has contents similar to those of the procedure in FIG. 17 if the logical pages in the description of FIG. 17 are replaced to the physical page.

Figure 19:
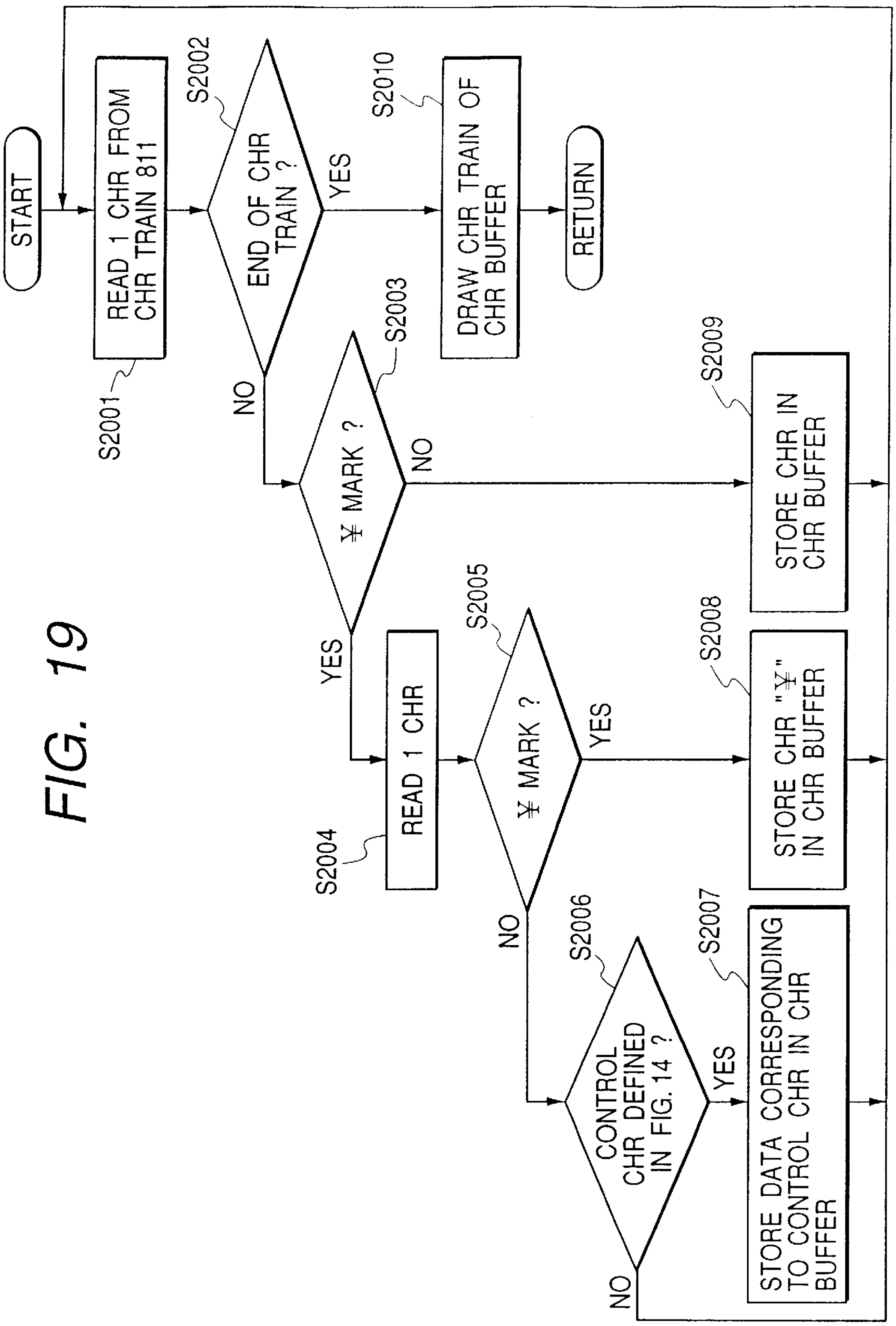
FIG. 19 is a flowchart for an additional drawing process for a character train including a control character train.

FIG. 19 is a flowchart showing the details of step S1704 in FIG. 17 or step S1804 in FIG. 18.

One character is read out from the character train 811 in FIG. 8 in step S2001.

Whether all of the characters have been read out or not is discriminated in step S2002. If YES, step S2010 follows. If NO, step S2003 follows.

If the read-out character is a control character such as "¥" in step S2003, it is regarded that the subsequent characters are a control character train, so that step S2004 follows and one more character is read. If NO, step S2009 follows and the read-out character is drawn and stored into the buffer.

If the read-out one more character train is "¥" in step S2005, step S2008 follows. It is regarded that the control character train is a character train to draw the character "¥", and the character "¥" is drawn and stored into the buffer.

If it is determined in step S2006 that the character read out in step S2004 is the control character defined in FIG. 14, step S2007 follows and the relevant character train is stored into the buffer. If NO, it is regarded that the read-out character is out of the definition, and the control character train is ignored. For example, if a control character train "¥p" is included in the character train, it is sufficient to obtain the page number in correspondence to the control character train and draw and store it into the buffer. Further, for example, by using a description such as "-¥p-", the page number can be drawn in a form such that a decoration of "-" is added to both sides of the page number.

In a manner similar to the above, if "¥u" is included in the character train, it is sufficient to obtain information such as a log-in name which is managed by the personal computer and store it as a character train into the buffer. If "¥d" is included in the character train, it is sufficient to draw time information of the personal computer as a character train and store it into the buffer. There are the following control character trains besides them.

¥f: document file name
¥N: total logical page number
¥P: total physical page number
¥h: hours of the print start time (date of making the spool file)
¥m: minutes of the print start time (date of making the spool file)
¥s: seconds of the print start time (date of making the spool file)
¥D: driver name
¥v: driver version As mentioned above, the image of the character train corresponding to the additional information stored in the buffer by the procedure shown in FIG. 17 is combined with the designated position of the logical page if the procedure of FIG. 17 is performed in step S1907 in FIG. 16, and is combined with the designated position of the physical page if the procedure of FIG. 17 is performed in step S1908. The color, size, style, etc. when the character train is developed as a character image are designated in accordance with FIG. 8.

In the embodiment as mentioned above, the page number of each logical page from the spooler 302 is stored in the spool file manager 304, the print request is issued to the despooler 305 on a physical page unit basis, and further in the despooler 305, the printing process is performed while reading out the designated print setting from the spool file 303. In this instance, the additional information is added on a unit basis of the logical page or physical page in accordance with the setting. The added additional information is converted by the printer driver into data in the format corresponding to the printer 1500, for example, a page description language, dot image data, or the like, and the converted data is sent to the printer and printed. At the stage when the additional information is developed to the dot image data, the additional information is drawn at the designated position as an image such as a character train shown by it.

With this method, the additional information can be easily added to a desired position every logical page or physical page.

As shown in FIG. 3, in the embodiment, after the print data was temporarily converted into the intermediate codes and spooled, the printing process is performed. Therefore, the additional information can be combined irrespective of the format of the print data, for example, format such as page description language format, raster format, or the like.

<Other Embodiments>

The invention can be applied to a system comprising a plurality of equipment (for example, a host computer, interface equipment, a reader, a printer, and the like) or an apparatus (a copying machine, a printer, a facsimile apparatus, or the like) comprising one equipment.

The object of the invention is also accomplished by a method such that a memory medium in which program codes of the procedures in FIGS. 5 to 7, 16, and 17 to realize the functions of the embodiment mentioned above have been stored is supplied to a system or an apparatus and a computer (or a CPU or an MPU) of the system or apparatus reads out the program codes stored in the memory medium and executes them.

In this case, the program codes themselves read out from the memory medium realize the functions of the foregoing embodiment. The memory medium on which the program codes have been stored constructs the invention.

As a memory medium to supply the program codes, for example, it is possible to use any of a floppy disk, a hard disk, an optical disk, a magnetooptic disk, a CD-ROM, a CD-R magnetic tape, a non-volatile memory card, an ROM, and the like.

The invention incorporates not only a case where the functions of the embodiment mentioned above are realized by a method such that a computer executes the read-out program codes but also a case where the OS (operating system) or the like which operates on the computer executes a part or all of the actual processes on the basis of instructions of the program codes and the functions of the embodiment mentioned above are realized by those processes.

The invention also incorporates a case where after the program codes read out from the memory medium were written into a memory provided for a function expansion board inserted in a computer or a function expansion unit connected to the computer, a CPU or the like provided for the function expansion board or function expansion unit executes a part or all of the actual processes on the basis of instructions of the program codes, and the functions of the embodiment mentioned above are realized by those processes.

According to the invention as described above, the additional information can be added to a reconstructed page layout by a format desired by the user.

What is claimed is:

1. A print control method carried out in an information processing apparatus which generates print data, including a printer control command, to be printed in a printer, said method comprising:

a spooling step, of entering, via a graphic engine, data provided by an application, converting the entered data into an intermediate code, and spooling the intermediate code as a spool file;

a supplying step, of reading the intermediate code spooled in said spooling step, adding designated additional information to the read intermediate code, converting the intermediate code with the additional information into data that can be recognized by the graphic engine, and supplying the converted data to the graphic engine; and a generating step, of entering, from the graphic engine, the converted data supplied to the graphic engine in said supplying step, and generating print data including the additional information based on the converted data.

2. A method according to claim 1, further comprising a page layout step, of performing a layout of a predetermined number of logical pages on a physical page, wherein if the intermediate codes are spooled by a logical page unit in said spooling step, said page layout step includes arranging the predetermined number of logical pages of intermediate codes by a physical page unit.

3. A method according to claim 2, wherein said page layout step includes arranging the predetermined number of logical pages within an effective print area of the physical page.

4. A method according to claim 1, further comprising a display control step, of controlling displaying of a dialogue window for setting addition of the additional information to the intermediate code, wherein said supplying step includes adding the additional information to the intermediate code if the addition of the additional information is set in the dialogue window.

5. A method according to claim 4, wherein it can be set in the dialogue window whether the additional information is to be added by a logical page unit or a physical page unit.

6. An information processing apparatus comprising:

a spooling unit, adapted to enter, via a graphic engine, data provided by an application, to convert the entered data into an intermediate code, and to spool the intermediate code as a spool file;

a supplying unit, adapted to read the intermediate code spooled by said spooling unit, adding designated additional information to the read intermediate code, to convert the intermediate code with the additional information into data that can be recognized by the graphic engine, and to supply the converted data to the graphic engine; and a generating unit, adapted to enter, from the graphic engine, the converted data supplied to the graphic engine by said supplying unit, and to generate print data including the additional information based on the converted data.

7. An apparatus according to claim 6, further comprising a page layout unit, adapted to perform a layout of a predetermined number of logical pages on a physical page, wherein if the intermediate codes are spooled by a logical page unit by said spooling unit, said page layout unit arranges the predetermined number of logical pages of intermediate codes by a physical page unit.

8. An apparatus according to claim 7, wherein said page layout unit arranges the predetermined number of logical pages within an effective print area of the physical page.

9. An apparatus according to claim 6, further comprising a display control unit, adapted to control a display unit to display a dialogue window for setting addition of the additional information to the intermediate code, wherein said supplying unit adds the additional information to the intermediate code if the addition of the additional information is set in the dialogue window.

10. An apparatus according to claim 9, wherein it can be set in the dialogue window whether the additional information is to be added by a logical page unit or a physical page unit.

11. A computer program for causing an information processing apparatus to perform:

a spooling step, of entering, via a graphic engine, data provided by an application, converting the entered data into an intermediate code, and spooling the intermediate code as a spool file;

a supplying step, of reading the intermediate code spooled in said spooling step, adding designated additional information to the read intermediate code, converting the intermediate code with the additional information into data that can be recognized by the graphic engine, and supplying the converted data to the graphic engine; and a generating step, of entering, from the graphic engine, the converted data supplied to the graphic engine in said supplying step, and generating print data including the additional information based on the converted data.

12. A program according to claim 11, wherein said program causes the information processing apparatus further to perform a page layout step, of performing a layout of a predetermined number of logical pages on a physical page, wherein if the intermediate codes are spooled by a logical page unit in said spooling step, said page layout step includes arranging the predetermined number of logical pages of intermediate codes by a physical page unit.

13. A program according to claim 12, wherein said page layout step includes arranging the predetermined number of logical pages within an effective print area of the physical page.

14. A program according to claim 11, wherein said program causes the information processing apparatus further to perform a display control step, of controlling displaying of a dialogue window for setting addition of the additional information to the intermediate code, wherein said supplying step includes adding the additional information to the intermediate code if the addition of the additional information is set in the dialogue window.

15. A program according to claim 14, wherein it can be set in the dialogue window whether the additional information is to be added by a logical page unit or a physical page unit.

* * * * *